United States Patent [19]

Roeber

[11] 4,121,049

[45] Oct. 17, 1978

[54] POSITION AND FORCE MEASURING SYSTEM

[75] Inventor: Frederick W. Roeber, Concord, Mass.

[73] Assignee: Raytheon Company, Lexington, Mass.

[21] Appl. No.: 783,538

[22] Filed: Apr. 1, 1977

[51] Int. Cl.$^2$ .................. G08C 21/00; G01G 3/14
[52] U.S. Cl. .................................. 178/18; 177/211
[58] Field of Search .............. 177/211, 210 R, 210 C, 177/210 EM, 210 FP; 73/141 R, 141 A, 172; 178/18, 19, 20

[56] References Cited

U.S. PATENT DOCUMENTS

| | | | |
|---|---|---|---|
| 3,164,014 | 1/1965 | Redner | 177/211 |
| 3,439,761 | 4/1969 | Laimins | 177/211 |
| 3,599,739 | 8/1971 | Hyer | 177/211 |
| 3,616,690 | 11/1971 | Harden | 177/211 |
| 3,657,475 | 4/1972 | Peronneau et al. | 178/18 |
| 3,692,129 | 9/1972 | Pratt et al. | 177/211 |
| 3,727,002 | 4/1973 | Pear, Jr. | 178/18 |
| 3,741,328 | 6/1973 | Andersson et al. | 177/211 |

Primary Examiner—Thomas A. Robinson
Attorney, Agent, or Firm—M. D. Bartlett; J. D. Pannone

[57] ABSTRACT

A position and force measuring system for determining the coordinates and force applied to a point on a rigid plate or surface fixed to a rigid foundation by means of a flexible support mechanism and at least three spaced apart sensors. The sensors each deliver an output signal which is proportional to the applied force and the coordinates of the force. The output signals are fed into a processor which computes the force and the coordinates at which the force is applied.

28 Claims, 9 Drawing Figures

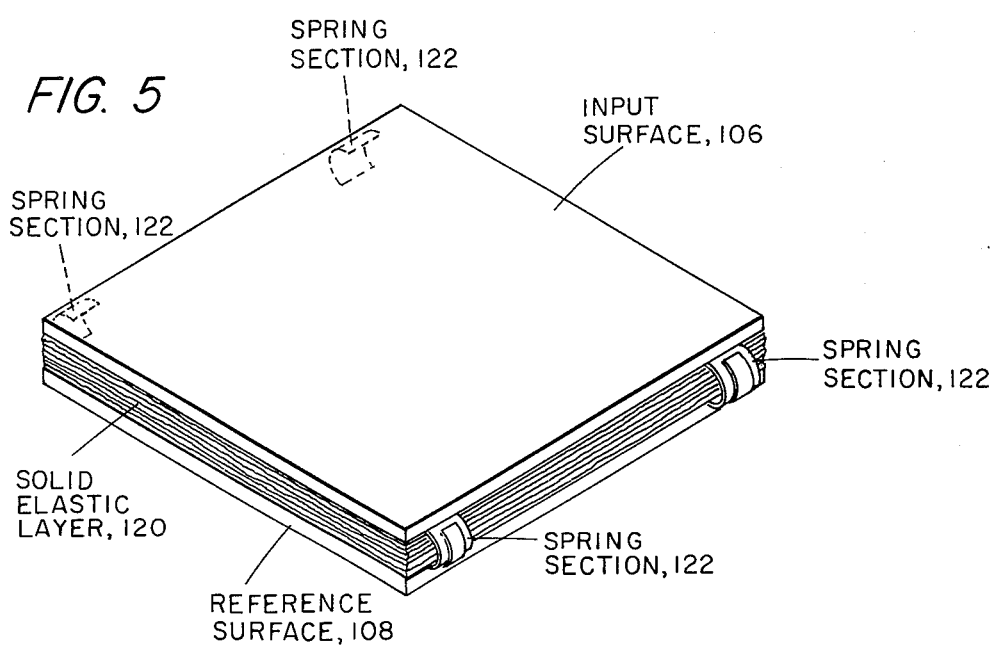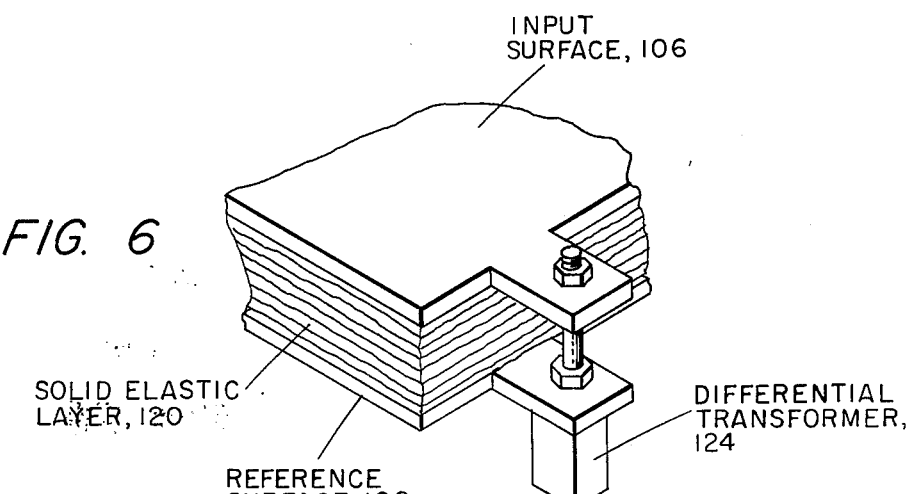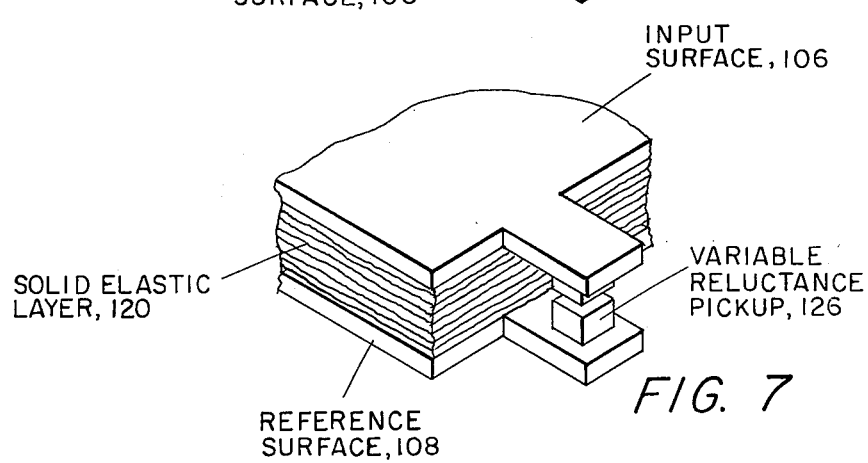

POSITION AND FORCE MEASURING SYSTEM

BACKGROUND OF THE INVENTION a. Field of the Invention

The present invention relates to a position and force measuring system by which a force and the position where it is applied are accurately determined. The system is mainly intended to determine the magnitude and position of application coordinates of force as it is dynamically or statically applied and to generate electrical voltages which are related to the force and its application coordinates by short column stress theory.

b. Description of the Prior Art

Systems for determining position coordinates on a plane or on a surface have taken many forms. Some of these require special interactive devices which either inject or receive energy. Others operate with an inactive pointer, such as a finger or a pencil, by measuring echo signal transit times, light beam interruptions, orthogonal wire contacts, capacitance change of distributed tabs, magnetostrictive interactions, and forces at the periphery of the surface. Such a technique is described in U.S. Pat. No. 3,657,475 to Peronneau et al. Therein is shown an input plate which is supported at its corners by sensorsupport combinations commonly known as load cells. Forces applied to the system are sensed by the corner sensor supports. The determination of the cartesian coordinates X and Y of the input point is made by solving equations which express the sum of the moments of the forces required to oppose the input force.

With the device described in the referenced patent the input plate must be horizontal and the input force must be perpendicular to the input surface due to gravitational effects. This represents a serious enough restriction to the operation of the device to make it impractical in many operational situations.

In the class of devices to which the present invention pertains, it is desirable to provide for continuous computation of present position coordinates as the input probe is moved around on the input surface and the input force magnitude varies. It is a disadvantage with the patented device that the input force must be static. This static limitation also severely restricts the application of the device.

Neither the device described in referenced U.S. Pat. No. 3,657,475 nor any other known position measuring device claims to measure the input force associated with the coordinates being measured. It is, of course, desired to measure this input force and use its magnitude to control either the action taken at the input coordinates or the action to be taken in response to the force being applied to the input coordinates.

SUMMARY OF THE INVENTION

It is an object of the present invention to provide a position and force measuring system, which may be operated at any spatial orientation independent of the direction of gravity.

Also, it is an object of the invention to provide such a structure having an input plate upon which a force is applied at an operator selected point.

Further, it is an object of the invention to provide such a device in which the output measured force and position are continually provided as the position of application of the input force is varied.

It is still further object of the invention to provide such a device in which the input force applied to the input plate or surface may be applied at any angle relative to the normal of the surface.

These, as well as other objects of the invention, may be met by providing a position and force measuring system having a rigid contoured or flat plate which is fixed to another rigid plate with a spring such as in the form of a flexible column, either solid or hollow, and including a minimum of three sensors located at selected points for measuring either strain in the mechanism or intra surface distances.

The application of force at a point on the first surface causes deformation of the column and voltages to appear at the output of the sensors. These voltages are combined in a processor unit which delivers a pair of output voltages or signals which are proportional to the coordinates of the point of application of the force on the surfaces and a third output which is proportional to the magnitude of the force. The coordinate output signals are used to control the setting of a readout device, such as an X-Y plotter, a cathode ray tube, X and Y meters, a display driven by a digital computer, or a set of servo-controlled positioning mechanisms.

The position output signals do not vary as force is varied. Therefore, the operator may vary the force without affecting the coordinate output signals. The variations of the force output signals may be used to control the generation of special symbols on the readout device at the input coordinates. It may also be used to control other devices such as feedback signal generators.

The invention may be used as an input device for either an analog or digital computer or it may be used to directly control, through analog or digital circuitry, a display device or position control system. The rigid input surface may be either optically clear or opaque depending on the application. A clear input surface is required in applying the device as an input mechanism to an interactive electronically driven cathode-ray tube display or other type of X-Y readout device. An opaque input surface would be satisfactory in a weighing instrument or position control device application. The support mechanism may vary depending on the intended application. In applications requiring a clear input surface, a support mechanism simulating a short hollow column is desirable. If the application allows the use of an opaque input surface, a support mechanism simulating a solid column may be more cost effective. In either case, the support mechanism may vary from specially shaped springs or pneumatic systems to layers of material such as, rubber, sponge, or foam rubber, foam plastic, etc. The elasticity, hysteresis and other mechanical properties of the support mechanism are selected for their compatibility with the requirements of the specific application. The signals generated by the sensors are processed in either an analog or a digital computer. The computer converts the raw data from the sensors into three outputs, X and Y coordinates and a signal which is proportional to input force. To preclude minor vibrations from affecting the output signals, a threshold circuit disconnects the output of the invention from the readout device until an input command of a certain force level is reached. The threshold is adjustable. To further preclude the effects of unwanted mechanical inputs, vibration dampers may be connected between the input surface and the reference surface.

BRIEF DESCRIPTION OF THE DRAWINGS

FIG. 5 is perspective view of another embodiment of the invention;

FIGS. 6 and 7 are perspective views of still further embodiments of the invention showing in detail the construction of the sensor;

DESCRIPTION OF THE PREFERRED EMBODIMENTS

Referring first to the views of FIGS. 1–4, there is shown a position and force measuring device constructed in accordance with the teachings of the present invention. Four sensors 101–104 are disposed near respective corners of a rigid input surface 106 and a rigid reference surface 108. Surfaces 106 and 108 are interconnected by four springs 111–114 which act in operation as what is known in the field of mechanics as a short column. In general, the column may be solid or hollow and the sensors may be connected either to the column as in FIGS. 1–4, or between the input surface and reference surface as shown below in FIGS. 5–7.

Figure 1:
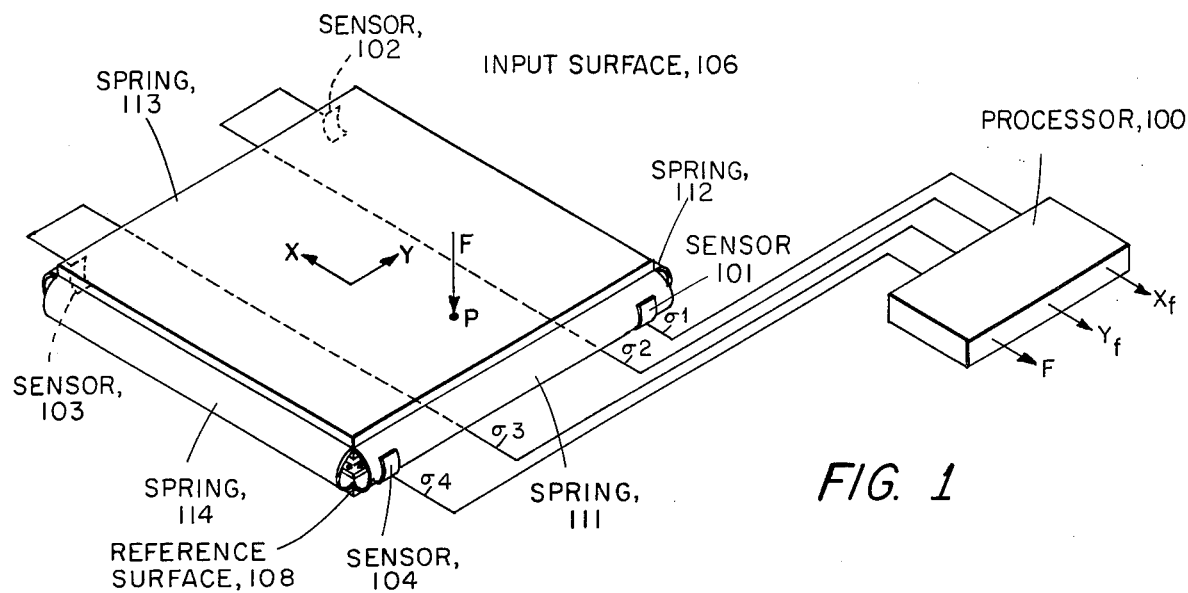
FIG. 1 is a perspective view of a position and force measuring system in accordance with the invention.
Figure 2:
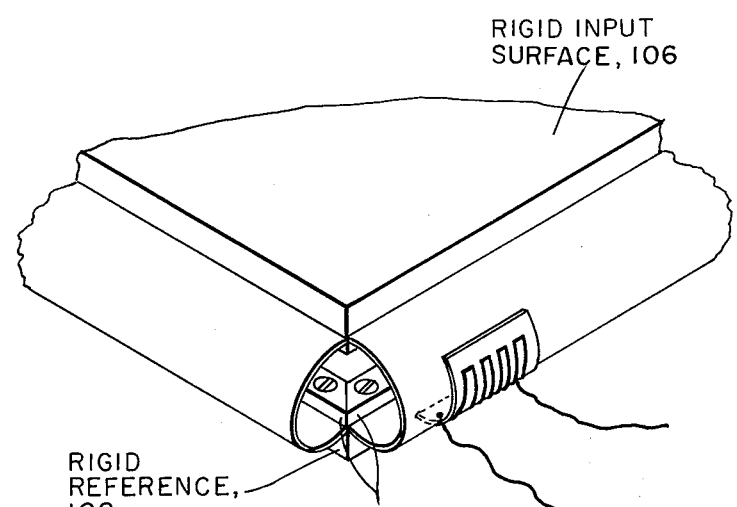
FIG. 2 is a partial sectional view of the embodiment shown in FIG. 1 illustrating the support mechanism.
Figure 3:
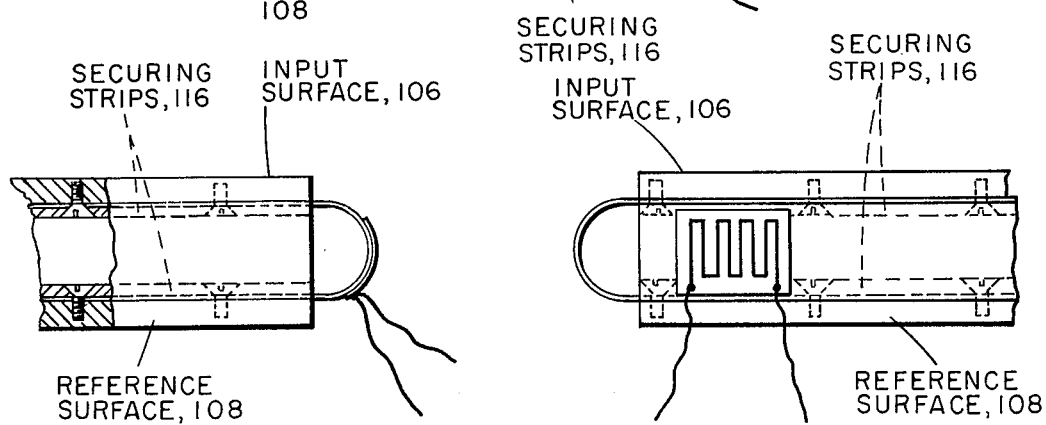
FIG. 3 is a partial sectional side view of the device shown in FIGS. 1 and 2.
Figure 4:
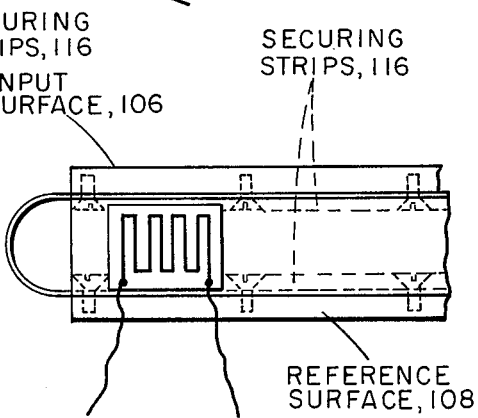
FIG. 4 is a different partial sectional front view of the device shown in FIGS. 1 and 2.

Preferably, as shown in FIG. 1, the springs are each shaped as half of a hollow cylinder with extended flanges connected at the edges of the flanges to surfaces 106 and 108. The radius of curvature, length and thickness of the spring may be chosen according to the size and weight of the device and the input forces associated with the application. The shape shown in FIGS. 1–4 has been found to function well for the display interactive system previously mentioned. The springs are attached along the edges of the input surface 106 and reference surface 108 by the clamping action of the screwed down securing strips 116. Materials which are suitable for fabricating springs 111–114 include: beryllium copper, stainless steel and selected plastics. The spring material under the clamp is mitered so that the length of the spring can coincide with the length of the input surface and rigid reference surface sides.

Strain gauges in preferred embodiments are used for sensors 101–104 with the sensitive axes of the strain gauges normal to the longitudinal axes of the springs. The strain gauges are installed on two opposite springs as shown in FIG. 1. The gauges are placed equidistant from each spring's end. The distance from the end of the spring to the gauge is chosen to allow enough room for installation of the gauge and its backing. The gauges are centered midway between the spring's line of attachment to input surface 106 and reference surfaces 108. With this structure, when a force is applied to a point on an exposed portion of the input surface, sensors 101–104 produce respectively in response to the force a set of voltages $\sigma_1$, $\sigma_2$, $\sigma_3$ and $\sigma_4$ which are each proportional to the distance between the point P and the corresponding sensor and also to the magnitude of the force. These voltages are coupled to processor 100 which from the voltages computes signals representing the coordinates of P and the magnitude of the applied force F in a manner to be described.

It is a distinct advantage of the invention that inputs to be sensed may be applied other than normal to the input surface. In the present invention cylindrical springs are located along each edge of the input surface. They extend from corner to corner and are shaped to allow freedom of movement of the input surface in one dimension, normal to a plane containing all springs, and restrict movement which is transverse or lateral to the normal. This design feature enables the present invention to work properly independent of the transverse force components associated with the input force as long as some normal component is present. This design minimizes the effects of the transverse input force component. The insensitivity of the device to these transverse forces also enables gravitational force effects to be electrically compensated for thus enabling it to be mounted in any attitude from horizontal to vertical.

FIGS. 5, 6 and 7 illustrate three alternate embodiments of the invention. These embodiments use alternate methods for interconnecting input surface 106 and rigid reference surface 108 and for measuring the strain resulting from force inputs to the input surface. The interconnection structure between the two surfaces is preferably a solid layer 120 of low modulus of elasticity material. This may fill the space between the surface or may form a solid wall along the edges of the surfaces. In either case, layer 120 is attached to the bottom of the input surface 106 and the top of reference surface 108. The strain measuring devices may include a section 122 of the spring as in the device of FIGS. 1–4 as shown here in FIG. 5, a linear position sensor 124 such as a linear variable differential transformer 124 as shown in FIG. 6 or a proximity distance measuring device such as a variable-reluctance pickup 126 as shown in FIG. 7.

In all embodiments, the forces applied to the system's input surface produces deformation of the supporting short column which is proportional to the magnitude of the force and the position of the force's application point. The deflection in the supporting column is related to the force and its application point, P, by the stress equation:

$$\sigma_n = \frac{F}{A} + \frac{F x_f x_s}{I_y} + \frac{F y_f y_s}{I_x}$$

where $\sigma_n$ is the stress in the side wall of the short column, F is the normal component of the input force's magnitude, A is the area of the cross section of the column which is normal to the column's sides, $x_f$ and $y_f$ are the coordinates of the input force, $I_x$ and $I_y$ are the moments of inertia of the column's cross section, and $x_s$ and $y_s$ are the coordinates of the point where strain is measured.

For a square or a rectangular input surface system with sensors symmetrically placed at or near the corners as for the device shown in FIG. 1, four stress equations solved simultaneously for $x_f$, $y_f$ and F result in the equations:

$$x_f = K_1 \frac{\sigma_1 + \sigma_4 - \sigma_2 - \sigma_3}{\sigma_1 + \sigma_2 + \sigma_3 + \sigma_4}$$

$$y_f = K_2 \frac{\sigma_1 + \sigma_2 - \sigma_3 - \sigma_4}{\sigma_1 + \sigma_2 + \sigma_3 + \sigma_4}$$

-continued
$$F = K_3(\sigma_1 + \sigma_2 + \sigma_3 + \sigma_4)$$

in which $\sigma_1$, $\sigma_2$, $\sigma_3$ and $\sigma_4$ are the strain related sensor outputs when X and Y axes pass through the center of the input plate or surface, $K_1$, $K_2$ and $K_3$ are scale factor constants. For each point of the input surface there is obtained a unique set of three voltages $x_f$, $y_f$ and F representative of the coordinates X and Y of said point, P, and the magnitude of the force, F, of the input. The value of $x_f$ and $y_f$ is independent of the magnitude of the force F applied to point P as can be seen from the last three equations above. It is also evident from these equations that the position coordinates $x_f$ and $y_f$ and the force magnitude F are independent of the column's cross-sectional area and the moments of inertia $I_x$ and $I_y$.

The coordinates of the point P at which the force is applied can be determined for every position on the input surface regardless of the shape of the surface which is not necessarily rectangular or square. It is also not necessary that the sensors be placed at the corners of the surface. If the sensors are not located at the corner of the input surface, the simultaneous solution of the stress equations will yield other equations for the solution of the input force coordinates, $x_f$ and $y_f$, and the input force magnitude, F. Further, if the input surface is not flat, obtained coordinates $x_f$ and $y_f$ correspond to those of the projection of point P onto the plane defined by the sensors, independent of the angle of the force at point P.

The system shown in FIG. 1 has four sensors since this arrangement presents advantages in the processing and exploitation of the signals delivered by these sensors. However, three sensors are enough for the determination of the position of a point on the input surface. Likewise, for some applications, it may be of interest to use more than four sensors. Simultaneous solution of the stress equations associated with such configurations would also yield different sets of equations and hence, implementation of such other sets of equations in circuitry would result in different circuits than those shown below in FIGS. 8 and 9.

The output of the signal from each sensor can be doubled by the addition of a strain gauge on the back side of the spring. The added gauges would be aligned with the gauges as shown in FIGS. 1-4. Electrically, they would replace resistors 57, 61, 65 and 69 in FIGS. 8 and 9 below.

Figure 8:
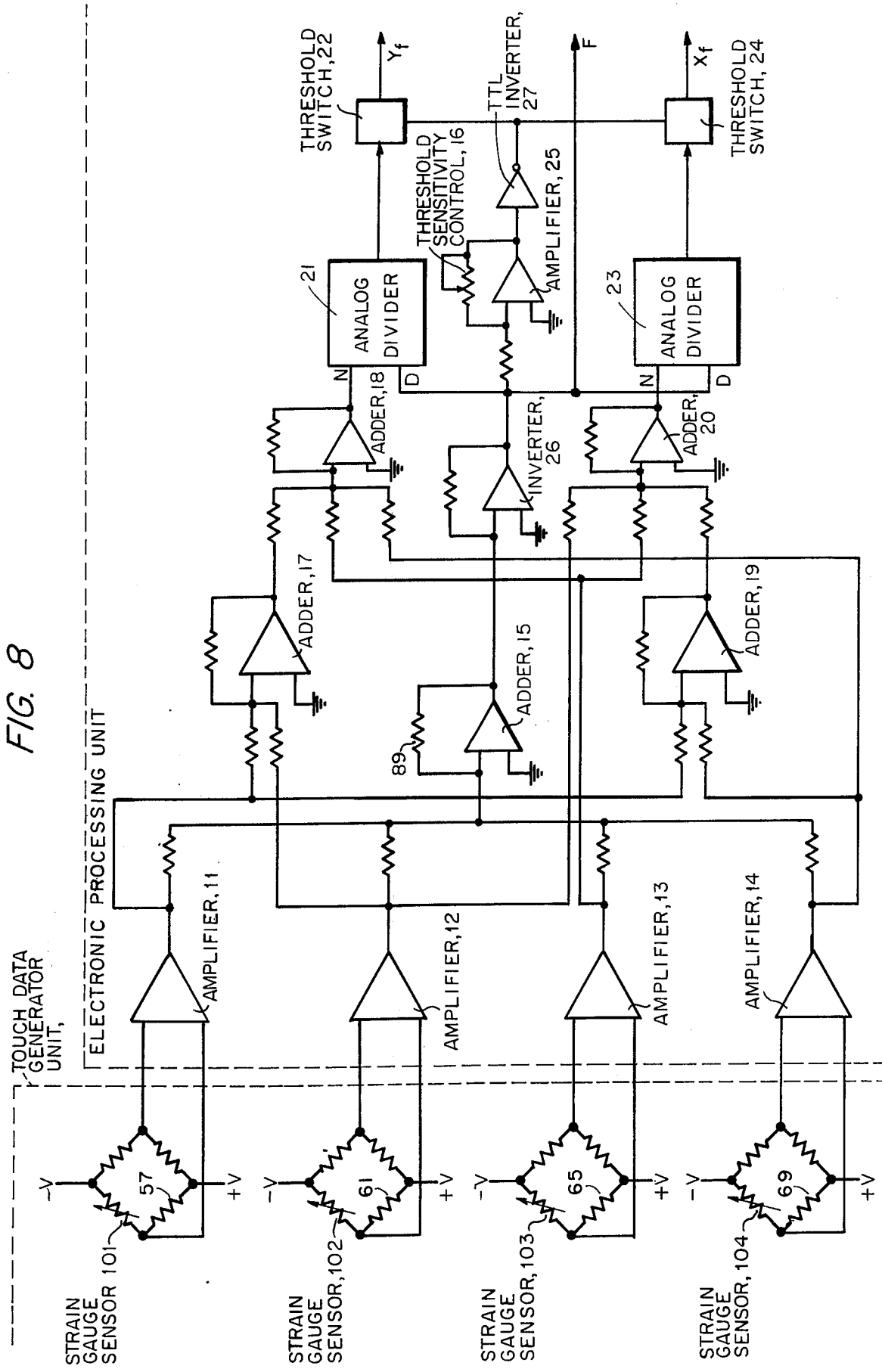
FIG. 8 is a block diagram of an analog version of a processing unit for use with the invention.
Figure 9:
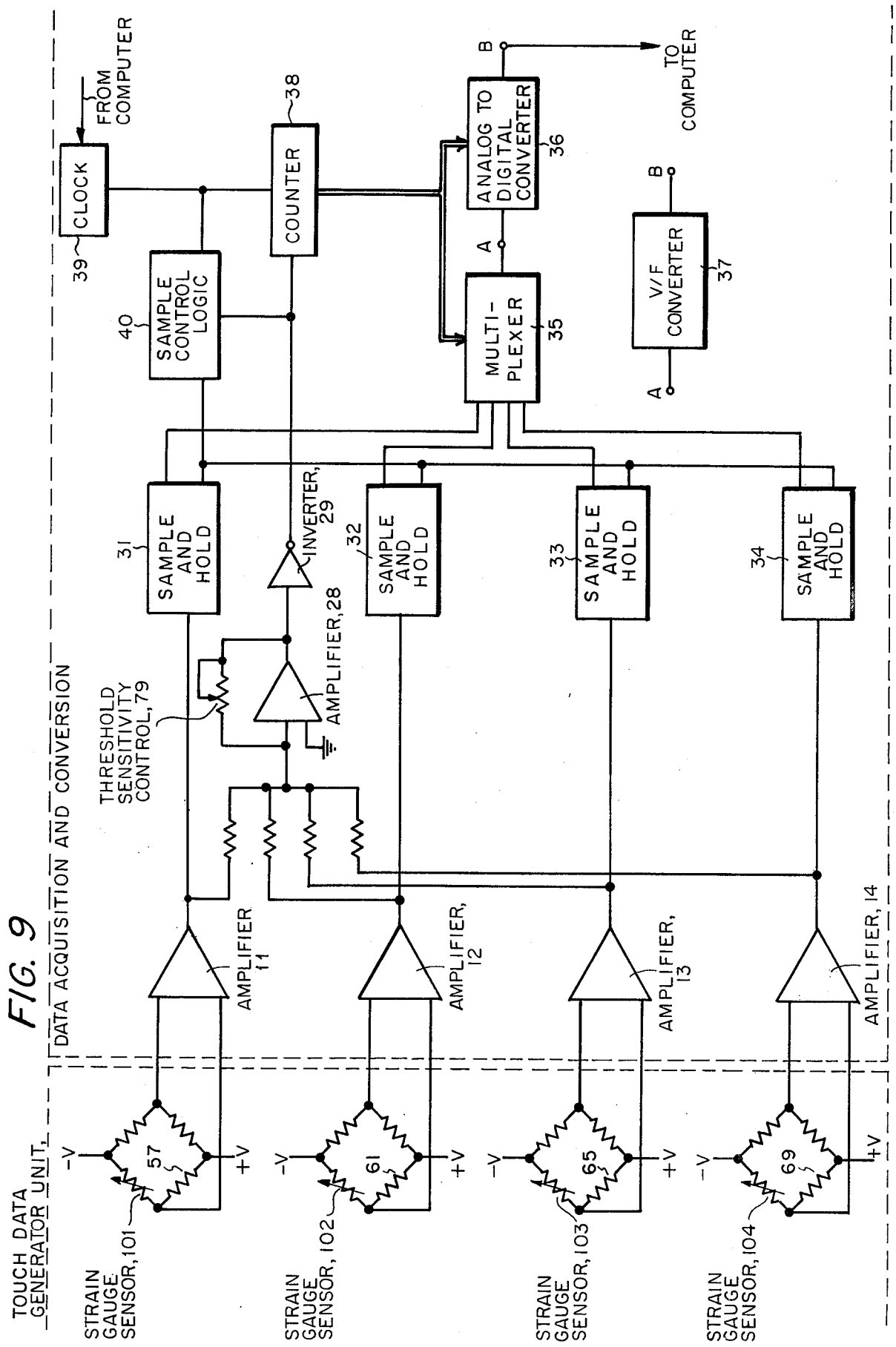
FIG. 9 is a block diagram of a digital processing unit for use with the invention.

FIGS. 8 and 9 show block diagrams of two exemplary electronic processing units in accordance with the invention. The analog unit shown in FIG. 8 delivers its output signals representing $x_f$, $y_f$ and F in response to the input signals $\sigma_1$, $\sigma_2$, $\sigma_3$ and $\sigma_4$ issuing from the four sensors 101-104 as in FIG. 1. As already mentioned, the amplitude of the signals $\sigma_1$ to $\sigma_4$ are proportional to strain in the side wall of the short column. Due to the nature of strain measurements, they are also proportional to the change in distance between the input surface edge and the adjacent support frame edge.

The determination of the signals representing $x_f$, $y_f$ and F requires the algebraic summing and division of the $\sigma_1$, $\sigma_2$, $\sigma_3$ and $\sigma_4$ signals in accordance with the latter three equations above. Sensors 101-104 are coupled to the processing circuitry through Wheatstone bridge circuits. The Wheatstone bridge becomes imbalanced as the sensors are activated producing input signals to the differential inputs of amplifiers 11-14. Adder 15 sums the outputs from all four of amplifiers 11-14 producing a signal representing $\sigma_1 + \sigma_2 + \sigma_3 + \sigma_4$. The remaining adders are coupled to form on the output of adder 18 $\sigma_1 + \sigma_2 - \sigma_3 - \sigma_4$ and on the output of adder 20 $\sigma_1 + \sigma_4 - \sigma_2 - \sigma_3$ as in the equations above. The output of adder 15 is inverted by inverter 26 and fed into the denominator input of both the $x_f$ and $y_f$ analog dividers 21 and 23. The respective outputs of adders 18 and 20 lead to numerator inputs of dividers 21 and 23.

The outputs of dividers 21 and 23 are connected to threshold switching circuits 22 and 24 respectively and then either directly to a display device or to a coding circuit which converts the analog signals representing $x_f$, $y_f$ and F to digital computer compatible codes. The output of inverter 26 is proportional to the applied force F and is available as an output for use externally. Inverter 26 outputs may be connected to a coding circuit for digital formatting.

To avoid errors which might be due to fortuitous vibrations of the input surface, damper devices (not shown) may be placed at the sensor locations indicated in FIG. 1. In addition, vibrations of small amplitude are eliminated by threshold devices 22 and 24 which are incorporated into the circuitry. To this end, the output of inverter 26 is fed through amplifier 25 and TTL inverter 27 to switches 22 and 24. The threshold switches control the passage of the signals representing $x_f$ and $y_f$ to the output circuit. Amplifier 25 has a threshold sensitivity control feedback potentiometer, 16, for adjusting the threshold switching level. Hence, for a determination of the signals representing $x_f$ and $y_f$ to occur, it is necessary that the sum of the signals representing $\sigma_1$ to $\sigma_4$ from sensors 101-104 be higher than the threshold established by switching level of TTL inverter 26.

The processing of the above equations can alternatively be performed in a digital computer using routine programming techniques. This alternative precludes the need for much of the circuitry shown in FIG. 8 but requires the addition of other circuit elements as shown in FIG. 9. The circuitry shown in FIG. 9 produces digital signals representing $\sigma_1$ to $\sigma_4$. The computer then uses these numbers to execute digitally the above equations.

The front end of the system is identical to that shown in FIG. 8 through amplifiers 11 to 14. The outputs of these amplifiers are fed to summing amplifier 28. Feedback potentiometer 79, associated with amplifier 28 provides threshold sensitivity control for activating the data acquisition and conversion circuits. The outputs of amplifiers 11 to 14 are each fed to sample and hold circuits 31 to 34, the outputs of which are connected to multiplexer 35. Under the control of counter 38, multiplexer 35 sequentially feeds the outputs of sample and hold 31 to 34 circuits through either analog to digital converter 36 or to voltage to frequency converter 37 to the digital computer. Sample control logic 40 and counter 38 are enabled by the output of inverter 29 generated by an input force that exceeds the threshold set by potentiometer 79. An enable signal from inverter 29 activates the sample control logic 40 and multiplexer 35. The sample control logic 40 simultaneously activates sample and holds 31 to 34 momentarily and then sequentially connects each sample and hold to the converter circuitry 36 or 37. When all four sample and holds 31 to 34 have been read, sample and hold logic 40 either halts or recycles depending on the application. In the latter case, the cycle starts with the momentary simultaneous activation of the sample and holds 31 to 34. The recycling continues as long as the above threshold force is present at the input. Clock circuit 39 provides the synchronizing pulses for the system. It is controlled by either the digital computer or eliminated by using the digital computer's clock.

In the interest of reducing the cost of the circuitry, sample and hold circuits 31 to 34 may be removed from the system and the amplifier outputs 11 to 14 may be connected directly to multiplexer 35, provided the sampling period is short enough to meet the application's requirements.

Although exemplary embodiments of the invention have been disclosed and discussed, it will be understood that other applications of the invention are possible and that the embodiments disclosed may be subject to various changes, modification and substitution without thereby departing from the spirit of the invention.

What is claimed is:

1. In combination:
   first and second substantially rigid bodies;
   spring means interconnecting said rigid bodies, said spring means extending along substantially the entire periphery of said substantially rigid bodies, said spring means restraining lateral movement between said first and second substantially rigid bodies; and
   means for producing electrical signals representing a change in distance between portions of said substantially rigid bodies in response to a force applied to one of said bodies.

2. The combination of claim 1 wherein at least one of said substantially rigid bodies comprises:
   a plate.

3. The combination of claim 2 wherein said electrical signal producing means comprises:
   a plurality of distance transducers positioned at spaced-apart locations near the periphery of said plate.

4. The combination of claim 3 wherein:
   said plate is of substantially rectangular shape.

5. The combination of claim 4 wherein:
   said plate is of substantially round shape.

6. The combination of claim 3 wherein said spring means comprises:
   four springs each having substantially the shape of a hollow half cylinder with extended flange portions, one of said springs being coupled along each edge of said plate.

7. The combination of claim 6 wherein said transducers comprise:
   three or more such transducers coupled to said spring means.

8. The combination of claim 7 wherein said transducers comprise:
   strain gauges.

9. The combination of claim 3 wherein said spring means comprises:
   a layer of elastic material positioned between said rigid bodies.

10. The combination of claim 9 wherein:
    said layer of elastic material is substantially continous between said rigid bodies.

11. The combination of claim 9 wherein:
    said layer of elastic material has hollow inner portions.

12. The combination of claim 9 wherein said elastic material comprises a material selected from the group comprising:
    rubber and plastic.

13. The combination of claim 9 wherein said elastic material comprises:
    metal aluminum.

14. The combination of claim 3 further comprising:
    means for producing one or more output signals representing the position of application of said force in response to signals produced by said electrical signal producing means.

15. The combination of claim 3 further comprising:
    means for producing an output signal representing the magnitude of said force in response to signals produced by said electrical signal producing means.

16. A system for measuring the point of application of static or dynamic force on an input surface and simultaneously determining the magnitude of said static or dynamic force, comprising in combination:
    (a) an input plate with an exposed surface subject to the application of localized force applied so as to have a component which is normal to the point where the force is applied;
    (b) a base plate;
    (c) one or more springs coupling said input surface to said base plate, said one or more springs extending along the major portion of the peripheries of said input plate and said base plate, said one or more springs preventing lateral motion between said input surface and said rigid body;
    (d) four sensors operatively mounted at spaced-apart points, each of said sensors producing a signal varying with a component of the applied force acting upon said exposed surface; and
    (e) calculating means with inputs coupled to said sensors for deriving from signals therefrom two output signals proportional to the coordinates of the point of application of said force with reference to a pre-established set of axes and an output signal proportional to the magnitude of said input force, said calculating means comprising:
       (i) a first through fourth sensor amplifier means coupled to each of said sensors;
       (ii) first summing means for summing the outputs of said amplifiers;
       (iii) an inverter coupled to the output of said summing means, the output of said inverter producing a first output signal proportional to the magnitude of the vertical component of the input force;
       (iv) a first divider and a second divider, said first output signal being coupled to form the denominator signal for said dividers;
       (v) a second summing means, outputs of said first and second sensor amplifiers being coupled to an input of said second summing means;
       (vi) third summing means, an input of said third summing means being coupled to outputs of said second summing means and said third and fourth sensor amplifiers, the output of said third summing means forming the numerator signal of the first divider;
       (vii) fourth summing means, inputs of said fourth summing means being coupled to outputs of said first and fourth sensor amplifier;

(viii) fifth summing means, inputs of said fifth summing means being coupled to outputs of said fourth summing means and said second and third sensor amplifiers, the output of said fifth summing means forming the numerator signal of the second divider, the outputs of said dividers representing the coordinates of the position of application of said force.

17. A system for measuring the point of application of static or dynamic force on an input surface and simultaneously determining the magnitude of said static or dynamic force, comprising in combination:

(a) an input plate with an exposed surface subject to the application of localized force applied so as to have a component which is normal to the point where the force is applied;

(b) a base plate;

(c) one or more springs coupling said input surface to said base plate, said one or more springs extending along the major portion of the peripheries of said input plate and said base plate, said one or more springs preventing lateral motion between said input surface and said rigid body;

(d) four sensors operatively mounted at spaced-apart points, each of said sensors producing a signal varying with a component of the applied force acting upon said exposed surface; and (e) calculating means with inputs coupled to said sensors for deriving from signals therefrom two output signals proportional to the coordinates of the point of application of said force with reference to a pre-established set of axes and an output signal proportional to the magnitude of said input force, said calculating means comprising:

(i) first through said fourth sensor amplifiers coupled to each of said sensors;

(ii) means for summing outputs of all of said sensor amplifiers;

(iii) an inverter coupled to the output of said summing means;

(iv) first through fourth sample-and-hold circuits, inputs of each of said sample-and-hold circuits being coupled to outputs of said first through fourth sensor amplifiers respectively; and (v) means for sequentially coupling outputs of said sample-and-hold circuits to output utilization means in response to output signals from said inverter means.

18. The combination of claim 17 wherein said sequential coupling means comprises:
a multiplexer.

19. The system as defined in claim 18 further comprising:
means for producing a binary count in response to said output signals from said inverter means, said multiplexer operating in response to said binary count.

20. A system as defined in claim 16 wherein said sensors comprise:
strain gauges.

21. A system as defined in claim 16 wherein said sensors comprise:
piezoelectric transducers.

22. A system as defined in claim 16 wherein said sensors comprise:
linear displacement transducers.

23. A system as defined in claim 16 wherein said sensors comprise:
proximity measurement transducers.

24. A system as defined in claim 16 further comprising:
a minimum of three damper elements interconnecting the input plate and the base plate for diminishing the effect of vibrations on the sensor outputs.

25. A system as defined in claim 17 wherein said sensors comprise:
strain gauges.

26. A system as defined in claim 17 wherein said sensors comprise:
piezoelectric transducers.

27. A system as defined in claim 17 wherein said sensors comprise:
linear displacement transducers.

28. A system as defined in claim 17 wherein said sensors comprise:
proximity measurement transducers.

* * * * *

UNITED STATES PATENT OFFICE
CERTIFICATE OF CORRECTION

Patent No. 4,121,049    Dated   Oct. 17, 1978

Inventor(s)   Frederick W. Roeber

It is certified that error appears in the above-identified patent and that said Letters Patent are hereby corrected as shown below:

Column 9, Claim 17, line 37: delete "said" .

Signed and Sealed this

Twenty-third Day of January 1979

[SEAL]

Attest:

RUTH C. MASON
*Attesting Officer*

DONALD W. BANNER
*Commissioner of Patents and Trademarks*